April 6, 1937.  C. E. REED  2,075,999
ROLLER CUTTER AND ANTIFRICTION BEARING ASSEMBLY FOR EARTH BORING DRILLS
Filed Aug. 2, 1935  2 Sheets-Sheet 1

Inventor;
Clarence E. Reed,

April 6, 1937. C. E. REED 2,075,999
ROLLER CUTTER AND ANTIFRICTION BEARING ASSEMBLY FOR EARTH BORING DRILLS
Filed Aug. 2, 1935 2 Sheets-Sheet 2
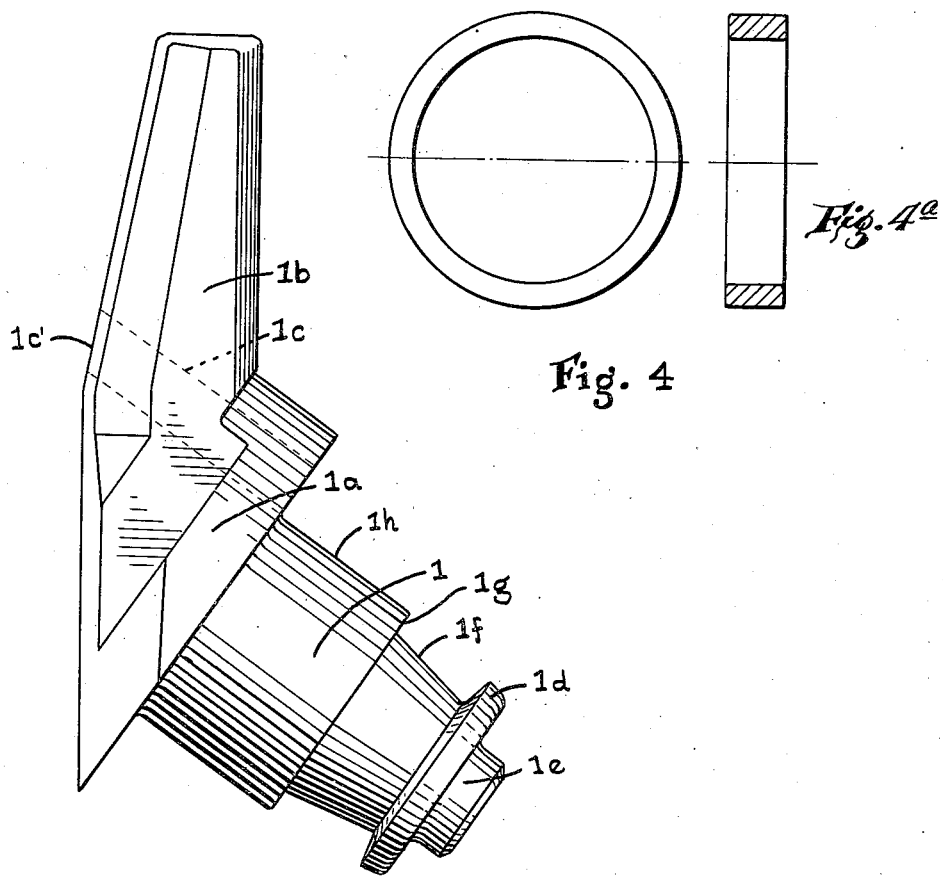
Inventor:
Clarence E. Reed,
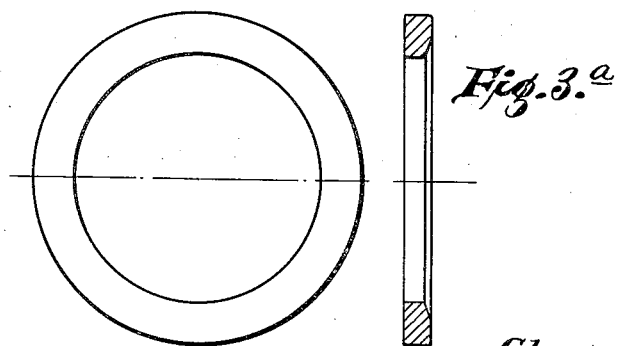
Attys.

Patented Apr. 6, 1937

2,075,999

UNITED STATES PATENT OFFICE 2,075,999

ROLLER CUTTER AND ANTIFRICTION BEARING ASSEMBLY FOR EARTH BORING DRILLS

Clarence E. Reed, Wichita, Kans., assignor to Chicago Pneumatic Tool Company, New York, N. Y., a corporation of New Jersey Application August 2, 1935, Serial No. 34,443

25 Claims. (Cl. 255—71)

This invention relates to a roller cutter assembly for earth boring drills, and particularly to an anti-friction type of assembly using a spindle integral with its support and having a flange integral with the spindle positioned between the end of the closed bore of a roller cutter and the ends of roller bearings.

One object of the invention is to provide in a roller bearing cutter assembly rotatively locking means in combination with a closed bore in a one piece cutter and an integral flange on a one piece spindle, without using threaded rings, or a hole and plug in the spindle or the cutter, or a sectional spindle.

Another object is to transmit all operating thrusts to spindle portions made in one piece integral with the support, avoiding the necessity of using a sectional spindle, or an aperture in the spindle.

Another object is to combine radial, tapered roller bearings, an end thrust bearing, limited friction bearing and locking means cooperating with a flange in a closed end bore of a roller cutter and provide a spindle integral with a support and the spindle having an integral flange between the closed end of the cutter bore and the integral flange in the cutter bore.

Another object is to provide a radial and end thrust rolling bearing and locking means in a closed end cutter bore, relieving radial roller bearings in the base of the cutter of end thrusts of the cutter towards the support, and a flange integral with a spindle integral with its support.

Another object is to provide a spindle integral with its support and having an integral flange adjacent its free end, positioned between the closed end bore of the cutter and the ends of rolling bearings and sustaining thrusts towards the drill axis of rotation, and an integral spindle sustaining all operating thrusts of the cutter.

The invention consists in the features, combinations and arrangement of the parts as will be described hereinafter and particularly defined in the claims.

In Fig. 1 of the drawings the invention is shown in connection with a frustoconical roller cutter, said drawings showing the cutter and rings in section and the spindle, antifriction bearings, base plate and shank in side elevation.

Fig. 2 is a view of the spindle only.

Fig. 3 is a view of the ring 6.

Fig. 3a is a sectional view of the ring of Fig. 3.

Fig. 4 is a view of the filler ring member 7.

Fig. 4a is a view of the filler ring member of Fig. 4 in section.

Figure 1:
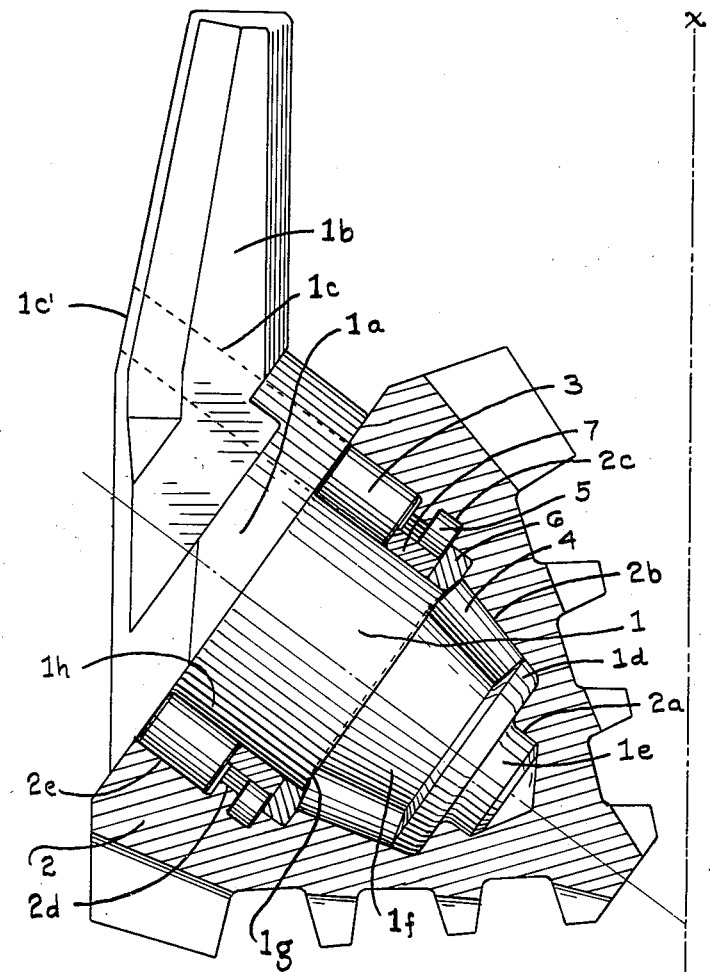

In the drawings 1 indicates the spindle; 1a the base plate; 1b the shank for attachment of the assembled unit to a bit head; 1c the hole or gateway in the base plate for insertion of the rollers 3 and the elements 5 into the open end bore of the cutter and into operating position; 1c' the plug for closing the hole 1c. The spindle has a flange 1d and a reduced diameter free end 1e forming a friction bearing surface. A tapered raceway is shown, 1f, and a shoulder on the spindle at 1g. The main cylindrical portion of the spindle is indicated at 1h. The frustoconical roller cutter is indicated by 2; roller bearings by 3; tapered bearings by 4; locking elements in the form of short rollers by 5; a thrust receiving floating ring by 6; and a filler floating ring member by 7. The cutter 2 has an exterior toothed surface and a bore opening through the base face and terminating within the cutter; 2a is a friction bearing surface in the bore of the cutter; 2b is the bearing surface in the bore of the cutter for tapered bearings 4; 2c is a groove in the bore of the cutter for reception of the locking elements 5; 2d is a flange like rib integral with the cutter and forming one side wall of the groove; 2e is a bearing surface for the roller bearings 3 in the base of the cutter.

By reason of the tapered spindle end, the integral flange on the spindle is of less outside diameter than the cylindrical, main bearing portion of the spindle, and therefore endless rings may be positioned as in this invention.

In assembling the parts, the filler ring member 7 is passed over the free end of the spindle and placed adjacent to the face of the base plate 1a, and the ring 6 is also placed on the main cylindrical portion 1h. The tapered bearings 4 are then placed in position in the raceway with the smaller ends against the flange 1d and the larger ends abutting the shoulder 1g. The ring 6 is then moved to its operating position and the cutter is placed in its operating position, enclosing the spindle, tapered bearings and rings 6 and 7. Then through the hole 1c in the base plate 1a the locking elements 5 are introduced into the raceway of the rollers 3 past the filler ring 7 and on into a position against ring 6 and moved radially outwardly into the groove 2c. After the locking elements 5 are all in position in the groove, the ring 7 is moved towards the free end of the spindle and fills the space between the locking elements 5 and the cylindrical portion of the spindle. The space between the cutter flange 2d and the cylindrical portion of the spindle is slightly wider than the diameter or width of the locking elements 5, hence the locking elements 5 may be readily passed into operating position in the groove. The purpose of these elements 5 is to lock the cutter rotatively on the spindle. Elements 5 are not intended to sustain radial loads of the cutter. Thrust of the cutter 2 towards the drill axis are resisted by the flange 2d contacting the flat sides or ends of elements 5, which elements contact ring 6 transmitting thereto the thrusts which are received by the upper half or outer portion of the end surfaces of the tapered bearings and sustained by the flange 1d, against which the full diameter of the smaller end of the tapered bearings has support. The flange 1d is an integral portion of the spindle. To complete the assembly the rollers 3 are introduced through the hole 1c into the raceway in the base of the cutter and bear on the cylindrical portion 1h of the spindle, and the bearing surface 2e of the cutter. The hole 1c is then filled by the plug 1c', which may be either screw threaded or spot welded.

It is well known that in operation the thrusts of the cutter are mainly and predominantly towards the support, outwardly from the drill axis of rotation; hence the cutter tends to move outwardly and its end thrust is sustained by the flange 1d and the tapered bearings and the shoulder 1g, and thus the radial rollers 3 are not subjected to end thrusts of the cutter, therefore the hole in the base plate requires no consideration from an operating standpoint—it has no function in the operation of the cutter, or the assembled parts. It will also be noted there is clearance between the inner ends of the rollers 3 and the cutter flange 2d. The rollers 3 may contact the ring 7, altho a small clearance is present, and the ring 7 may move very slightly longitudinally of the spindle. Ring 7 is merely a filler member to hold the elements 5 in the groove and does not sustain operating loads of the cutter. The ring 6 is also formed with small clearances all round. The rollers 3 prevent any displacement of the filler ring member 7 in operation. The ring 6 does not receive radial loads of the cutter but does sustain end thrusts and transmits the same from locking elements 5 to tapered bearings 4.

The complementary frictional bearings at the free end of the spindle and the cutter bore serve to maintain the axial alignment of the cutter on the spindle and rolling bearings.

The axis of drill rotation is indicated by the dotted line x—x. The spindle axis inclines downwardly and inwardly towards the axis of rotation of the drill. The cutter has two cutting zones on its toothed periphery, the base zone dominating the rolling motion of the cutter. The teeth on the apex portion of the cutter are spaced widely apart, the spacing at tooth crest being wider than the tooth edge. A plurality of cutter units are used in each complete drill assembly.

What I claim is:

1. In a roller cutter assembly and in combination a spindle and its support formed in one piece, said spindle having a tapered free end portion with a flange formed integral therewith, a roller cutter enclosing the spindle and flange, means locking the roller cutter rotatively on the spindle including members engaging within an annular groove in the cutter bore and a ring on the spindle engaged by said locking members, said flange being of less outside diameter than the bore of the ring. rolling bearings between the spindle and the cutter, said ring being positioned between the groove in the cutter and the said flange.

2. In a roller cutter assembly for earth boring drills, a spindle in one piece throughout having an annular flange integral therewith, a support for the spindle in one piece therewith, a one piece cutter enclosing the spindle and having a bore opening through its base face, the entire spindle and the entire cutter being adapted for assembly by one and the same movement of the one relative to the other, rolling bearings and rolling locking members between the cutter and spindle, insertable through the open bore of the cutter after assembly of said cutter and spindle, said spindle and cutter having complementary bearing surfaces, for the rolling bearings, unbroken throughout, said support having a gateway common to and for the introduction of the rolling bearings and rolling locking members into place between the cutter and the spindle, said flange sustaining thrust from the rolling locking members, substantially as described.

3. A roller cutter unit comprising a support and a spindle formed in one piece with a flange adjacent the free end of the spindle, a tapered bearing surface, a thrust receiving shoulder and a cylindrical bearing surface on said spindle, a roller cutter having a bore open at the base face of the cutter, bearing surfaces in said bore complementary to the bearing surfaces on said spindle, a groove in the cutter bore, and a ring cooperating with rollers in said groove and with tapered rolling bearings contacting said flange at their smaller ends and said thrust receiving shoulder at their larger ends, said rollers, ring, tapered rolling bearings and flange cooperating to rotatively lock said cutter on said spindle.

4. A roller cutter unit according to claim 3, and a filler ring member retaining said rollers in said groove.

5. A roller cutter unit comprising a support and a spindle formed in one piece with a flange, a cutter on the spindle, tapered radial and end thrust receiving roller bearings between the cutter bore wall and the spindle and contacting an end thrust receiving shoulder on the spindle, radial thrust sustaining roller bearings between the cutter bore wall and the spindle adjacent the support, and means interposed between the cutter and spindle intermediate of the roller bearings and the tapered bearings and cooperating with the latter and the flange rotatively locking the cutter on the spindle.

6. In a roller cutter assembly including a spindle formed in one piece with its support and a flange at its free end, the combination of a cutter, tapered roller bearings sustaining radial and end thrusts imposed by the cutter, said rollers bearing at their smaller ends on said flange and cooperating with other parts including a floating ring rotatively locking the cutter on the spindle, said floating ring bearing on the end faces at the larger ends of said rollers.

7. As an article of manufacture, a support and a spindle formed in one piece with a flange adjacent the spindle free end, said spindle having on its periphery a cylindrical bearing surface and a tapered bearing surface, said spindle having also a shoulder between said surfaces forming an end thrust receiving surface on said spindle between the support and said flange.

8. In a roller cutter assembly and in combination, a support and a spindle formed in one piece with an integral flange, a roller cutter enclosing the spindle and flange, and means including rollers in a groove in said cutter and a substantially endless floating ring on the spindle positioned between said flange and said rollers rotatively locking said cutter on said spindle.

9. The combination of a support, a spindle and a flange formed in one piece, a roller cutter on said spindle, a groove in the spindle offset in relation to a groove in the bore of the roller cutter, an endless ring on the spindle positioned between the grooves, and rollers cooperating with the grooves, ring and the flange rotatively locking a roller cutter on the spindle.

10. The combination of a support, a spindle having a cylindrical bearing surface and a grooved tapered free end portion formed in one piece with the support, a roller cutter enclosing the spindle and floating rings positioned on the cylindrical surface between roller bearings interposed between the spindle and cutter on the cylindrical spindle bearing surface and in the groove of the tapered free end respectively.

11. In combination in a rotary cutter unit for earth boring drills, a spindle having a plurality of raceways for rolling bearings, a toothed roller cutter enclosing the spindle and having raceways complementary to those of the spindle, said spindle having an annular flange adjacent its free end, two sets of rolling bearings between the complementary raceways of the spindle and roller cutter and means for locking the roller cutter rotatively on the spindle comprising two floating rings within the roller cutter and surrounding the spindle, and a set of rollers engaging the roller cutter in a groove in the bore thereof, said rings and last mentioned rollers being located between the two sets of roller bearings.

12. In a roller cutter unit and in combination, a spindle initially formed in one piece having an exterior bearing surface, a support for the spindle, said spindle being enclosed by a roller cutter initially formed in one piece, floating elements between the cutter and the exterior of the spindle rotatively locking the cutter on the spindle, and plain rolling bearings independent of said floating elements but in the bore of the cutter therewith, said elements and said rolling bearings both being positioned between plain unbroken surfaces on said spindle and said cutter.

13. A roller cutter and anti-friction bearing assembly for earth boring drills comprising a spindle and support formed in one piece, said spindle having a cylindrical roller bearing periphery, a one piece roller cutter on said spindle having a bore with a cylindrical roller bearing wall complementary to and spaced apart from the cylindrical peripheral surface of the spindle, said cylindrical bearing wall of the bore of the cutter extending to the base face of the cutter, said spindle having between it and the spindle support an annular face in a plane at right angles to the axis of the spindle and closing the end of the cylindrical bore of the cutter except at a point where an opening through the support connects with said bore, plain cylindrical roller bearings being insertable through said opening into place between the wall of the cylindrical bore of the cutter and the cylindrical periphery of the spindle by an axial movement of said rollers substantially parallel with the axis of the spindle, means for closing the opening through the support and means for locking the roller cutter rotatively on the spindle, the complementary cylindrical roller bearing surfaces of the spindle and cutter being plain and unbroken throughout, said locking means in part being inserted through the opening in the support substantially as described.

14. A roller cutter and anti-friction bearing assembly for earth boring drills comprising a spindle and support formed in one piece, said spindle having a cylindrical roller bearing periphery, a one piece roller cutter on said spindle having a bore with a cylindrical roller bearing wall complementary to and spaced apart from the cylindrical peripheral surface of the spindle, said cylindrical bearing wall of the bore of the cutter extending to the base face of the cutter, said spindle having between it and the spindle support an annular face in a plane at right angles to the axis of the spindle and closing the end of the cylindrical bore of the cutter except at a point where an opening through the support connects with said bore, plain cylindrical roller bearings being insertable through said opening into place between the wall of the cylindrical bore of the cutter and the cylindrical periphery of the spindle by an axial movement of said rollers substantially parallel with the axis of the spindle, means for closing the opening through the support and means for locking the roller cutter rotatively on the spindle, the complementary cylindrical roller bearing surfaces of the spindle and cutter being plain and unbroken throughout, said locking means in part being inserted through the opening in the support, the part of the locking means which is inserted through the opening in the support being finally positioned by a movement radially outward from the spindle axis into a groove in the wall of the cutter bore, and means between the cutter and spindle for maintaining said rotative locking means in place and for taking the locking thrust of said locking means and imposing the same upon a part of the spindle, substantially as described.

15. A roller cutter and anti-friction bearing assembly for earth boring drills comprising a spindle and support formed in one piece, said spindle having a cylindrical roller bearing periphery, a one piece roller cutter on said spindle having a bore with a cylindrical roller bearing wall complementary to and spaced apart from the cylindrical peripheral surface of the spindle, said cylindrical bearing wall of the bore of the cutter extending to the base face of the cutter, said spindle having between it and the spindle support an annular face in a plane at right angles to the axis of the spindle and closing the end of the cylindrical bore of the cutter except at a point where an opening through the support connects with said bore, plain cylindrical roller bearings being insertable through said opening into place between the wall of the cylindrical bore of the cutter and the cylindrical periphery of the spindle by an axial movement of said rollers substantially parallel with the axis of the spindle, means for closing the opening through the support, means for locking the roller cutter rotatively on the spindle, the complementary cylindrical roller bearing surfaces of the spindle and cutter being plain and unbroken throughout, said locking means in part being inserted through the opening in the support and in part consisting of frusto-conical rollers in a groove of the spindle nearer the free end of the spindle than the roller bearings first mentioned, said frusto-conical rollers taking end thrust of the cutter outwardly towards the support.

16. A roller cutter, spindle and anti-friction bearing assembly for earth boring drills comprising a spindle, a roller cutter on the sprindle having a bore opening through its base face, rollers for locking the roller cutter on the spindle rotatively, said cutter having a groove in its bore for receiving said locking rollers, and a ring shaped means for holding the rollers in said groove, said ring shaped means being shiftable axially along the spindle to lie between the said rollers and the spindle after the rollers have been seated in the cutter groove, substantially as described.

17. An assembly according to claim 16 in which rolling bearings are inserted into the bore of the cutter at its base after the ring shaped means has been shifted to position for holding the locking rollers in operative position.

18. A roller cutter and anti-friction bearing assembly for earth boring drills according to claim 16 in which the spindle support has a gateway therethrough by which access may be had to the shiftable locking means for setting the same in locking position.

19. In a cutter unit and in combination, a spindle formed in one piece, a roller cutter surrounding the spindle and having a groove in a bore, locking elements in said groove and a ring between the elements and the periphery of the spindle, said ring being shiftable, after the roller cutter has been positioned on the spindle, in a direction parallel with the axis of the spindle into position to retain the elements in locking position.

20. In an anti-friction bearing assembly in a roller cutter unit, two sets of rolling retaining elements cooperating with a floating ring all positioned intermediate rolling bearings and an integral flange on a spindle, which spindle is formed initially in one piece with its support, said flange sustaining thrust of said cutter retaining elements, and a roller cutter enclosing the assembly therein.

21. A roller cutter, spindle and anti-friction bearing assembly for earth boring drills comprising a spindle, a roller cutter having a bore opening through its base face, rolling locking means for retaining the roller cutter on the spindle rotatively, said cutter having a groove in its bore for receiving the rolling locking means, and ring shaped means for holding the rolling locking means in said groove, said ring shaped means being shiftable axially along the spindle to lie between the said rolling locking means and the spindle after the rolling locking means have been seated in the cutter groove, substantially as described.

22. An assembly according to claim 21 in which rolling bearings are located in the bore of the cutter at its base, between the said ring shaped means and the base face of the cutter, substantially as described.

23. In combination, a spindle, a support therefor, a roller cutter rotatively mounted on the spindle and having a groove in the wall of its bore, rotative locking elements, ring shaped means for holding the said elements partly in the groove, a bearing on the spindle receiving the locking thrust from said elements, said spindle support having a gateway opening in the cutter bore through which access may be had to the locking elements and to the ring shaped means for placing said elements and ring in position, and means for closing said gateway.

24. In combination in a roller cutter and bearing assembly for earth boring drills, a spindle support, a spindle, in one piece, projecting from the support and having a free end, a frusto-conical raceway at the free end of the spindle, a cylindrical raceway on the spindle located at a point between said frusto-conical raceway and the spindle support, said frusto-conical raceway being defined at its larger diameter end by an annular shoulder on the spindle, frusto-conical roller bearings on the frusto-conical raceway having their larger diameter end faces engaging said annular shoulder, cylindrical roller bearings on the cylindrical raceway of the spindle, a frusto-conical roller cutter embracing the free end of the spindle and having raceways complementary to the frusto-conical and cylindrical raceways of the spindle and contacted by said frusto-conical and cylindrical roller bearings, said cylindrical roller bearings taking radial loads and the frusto-conical rollers taking both radial loads and also end thrust of the cutter outwardly towards the spindle support, a ring encircling the spindle and engaging the larger end faces of the frusto-conical roller bearings, a flange on the spindle engaging the smaller ends of the frusto-conical cutters, and rolling means engaging a shoulder on the cutter and said ring for rotatively locking the cutter on the spindle, substantially as described.

25. A roller cutter and bearing assembly for earth boring drills comprising a support, a spindle projecting from said support having a cylindrical bearing surface with a frusto-conical bearing surface between said cylindrical surface and the spindle free end, a frusto-conical roller cutter having a bore with bearing surfaces therein complementary to the cylindrical and frusto-conical bearing surfaces of the spindle, cylindrical roller bearings between the said complementary cylindrical bearing surfaces of the spindle and roller cutter arranged on axes parallel with the axes of the spindle and taking radial loads of said roller cutter, frusto-conical roller bearings between the complementary frusto-conical bearing surfaces of the spindle and roller cutter taking radial loads and also taking on their peripheries end thrust of the roller cutter outwardly towards the spindle support, preventing imposition of said end thrust upon the peripheries of the cylindrical rollers, and means additional to the roller bearing organization locking the roller cutter rotatively on the spindle, substantially as described.

CLARENCE E. REED.